(No Model.)

A. BIRNBAUM.
RESILIENT TIRE.

No. 598,763. Patented Feb. 8, 1898.

Witnesses.
Robert Everett
F. B. Keefer

Inventor.
Anton Birnbaum,
By James L. Norris,
Atty.

THE NORRIS PETERS CO., PHOTO-LITHO., WASHINGTON, D. C.

UNITED STATES PATENT OFFICE.

ANTON BIRNBAUM, OF TAMPA, FLORIDA.

RESILIENT TIRE.

SPECIFICATION forming part of Letters Patent No. 598,763, dated February 8, 1898.

Application filed October 29, 1897. Serial No. 656,811. (No model.)

*To all whom it may concern:*

Be it known that I, ANTON BIRNBAUM, a citizen of the United States, residing at Tampa, in the county of Hillsborough and State of Florida, have invented new and useful Improvements in Resilient Tires, of which the following is a specification.

My invention relates to an improved tire for use on bicycles, sulkies, carriages, and the like, and has for its object to provide a tire which shall afford the cushioning effect incident to pneumatic tires without necessitating the employment of compressed air.

The invention therefore consists of improvements in that class of tires popularly known as "cushion-tires;" but it differs from any tire of this description of which I am aware in that it affords a greater degree of resiliency, while by its peculiar construction absolutely insuring against the cracking and breaking of the tire at its side surfaces due to bending under pressure.

I have illustrated my invention in the accompanying drawings, in which—

Figure 1:
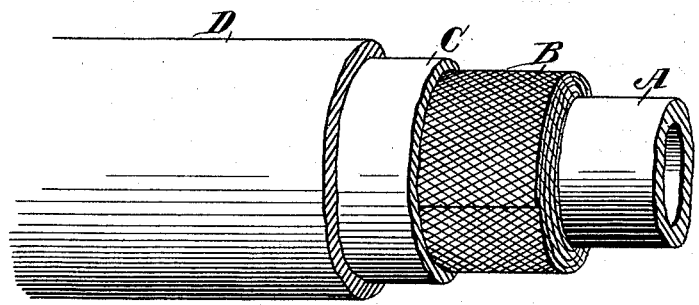
Figure 2:
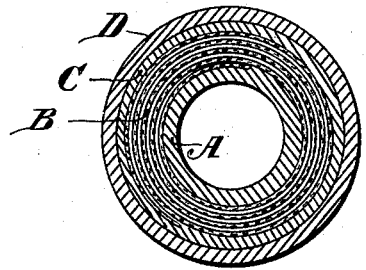

Figure 1 represents a side view of a portion of a tire made according to my invention, the same being broken away at one end at intervals to disclose the successive layers of material employed; and Fig. 2 is a cross-section through the tire.

Referring to the drawings, the letter A indicates an inner thick tube of vulcanized rubber, somewhat harder than ordinary rubber tubing. Surrounding this inner tube are a number of plies of linen or canvas B, which before application are coated with unvulcanized rubber. This rubber becomes slightly hardened when heated in the process of manufacturing the tire. Upon the layers of linen and rubber I next place a thin layer or tube C of hard vulcanized india-rubber, which, nevertheless, possesses sufficient flexibility to give or yield slightly under pressure. Over all is then placed the outer tube D, of rubber, which may and preferably is slightly harder than the outer tube usually employed on tires.

By constructing my tire as described I have found in practice that it affords an ample degree of resiliency, while the comparatively thick inner tube, surrounded by a number of layers of rubber-coated linen or canvas and the thin hard-rubber tube C, provides a structure which is strong enough to yield sufficiently under pressure without breaking. For buggies, carriages, sulkies, and all vehicles other than bicycles, where comparatively heavy tires are employed, my tire will be found specially applicable, as no compressed air is used, and the inconveniences and trouble resulting from punctures, which are incident to the use of pneumatic tires, are avoided in my construction. It may be stated, nevertheless, that my tire is practically non-puncturable, and should it be desired to use it in connection with compressed air the various layers, with the exception of tube C, would be made relatively thinner than where the tire is to be used as a cushion-tire. The hard-rubber tube C, in connection with the layers of rubber-coated linen and the medium-hard inner rubber tube, will be found sufficient to resist penetration from any ordinary puncturing matter.

Having thus fully described my invention, what I claim is—

1. A tire for bicycles, sulkies, and the like, comprising an inner rubber tube surrounded by a vulcanized, comparatively hard, rubber tube, a number of layers of rubber-coated linen or canvas interposed between said tubes, and an outer rubber tube, substantially as described.

2. A tire for bicycles, sulkies, and the like, comprising a thin vulcanized, comparatively hard, rubber tube C, an outer rubber tube surrounding it, an inner rubber tube A thicker but softer than said tube C, and a number of layers of rubber-coated linen or canvas interposed between said tubes A and C, said layers being formed by progressively winding on said tube A a sheet of rubber-coated linen or canvas, substantially as described.

In testimony whereof I have hereunto set my hand in presence of two subscribing witnesses.

ANTON BIRNBAUM.

Witnesses:
PAUL WORTH SMITH,
P. O. KNIGHT.